Oct. 5, 1965

N. T. KARLÉN 3,209,846

WEIGHING DEVICE FOR GOODS TRANSPORTED ON A CONTINUOUSLY
MOVABLE CONVEYOR PATH

Original Filed Aug. 15, 1960

2 Sheets-Sheet 1

INVENTOR

NIAL TORBJÖRN KARLÉN

BY *Larson and Taylor*

ATTORNEYS

Oct. 5, 1965 N. T. KARLÉN 3,209,846
WEIGHING DEVICE FOR GOODS TRANSPORTED ON A CONTINUOUSLY
MOVABLE CONVEYOR PATH
Original Filed Aug. 15, 1960 2 Sheets-Sheet 2

INVENTOR
NIAL TORBJÖRN KARLÉN

United States Patent Office 3,209,846
Patented Oct. 5, 1965

1

3,209,846
WEIGHING DEVICE FOR GOODS TRANSPORTED ON A CONTINUOUSLY MOVABLE CONVEYOR PATH
Nial Torbjörn Karlén, Olovsvagen 19, Tumba, Sweden
Original application Aug. 15, 1960, Ser. No. 49,784, now Patent No. 3,173,503, dated Mar. 16, 1965. Divided and this application Dec. 14, 1964, Ser. No. 418,166
Claims priority, application Sweden, Sept. 4, 1959, 8,202/59, Patent 181,034
11 Claims. (Cl. 177—211)

This is a division of application Serial No. 49,784, filed Aug. 15, 1960, now Patent No. 3,173,503.

One knows already different devices for weighing goods, transported on a continuously movable conveyor path. In one known kind of such weighing devices one has arranged one of the rollers rotating synchronously with the movement of the conveyor to drive a tachometer generator, whereas a roller, carrying the weight of the conveyor and the conveyed goods, has been connected to an impedance contained in a bridge coupling, usually a resistor, in such a way that this resistance has varied in agreement with the combined weight of the section concerned of the conveyor band and the goods conveyed on said conveyor band. The voltage from the tachometer generator has been fed to the bridge arrangement as working voltages, and the unbalance voltage, which will thus be a function of the speed of transportation as well as of the weight of the goods transported in each separate moment, has been used as the indicating magnitude.

The present invention refers to an arrangement of this common kind.

The accuracy in traditional weighing devices has hitherto been unsatisfactory. This invention regards an improvement in relation to the traditional weighing devices, by means of which a satisfactory accuracy shall be obtained without the weighing device therefore being too complicated or too expensive.

According to the invention the output voltage from the bridge coupling is caused to influence a control arrangement for a preferably alternating current driven servo motor, which, in its turn, drives the tachometer generator. The voltage of the tachometer generator is connected in counter-coupling to the voltage from the bridge coupling, so that, at correct number of turns of the servo motor, balance of voltage is maintained. The total number of turns of the servo motor will then form a measure of the combined amount of material transported by means of the band conveyor, whereas its momentary number of turns will form a measure of the transportation capacity used in each moment.

Figure 1:
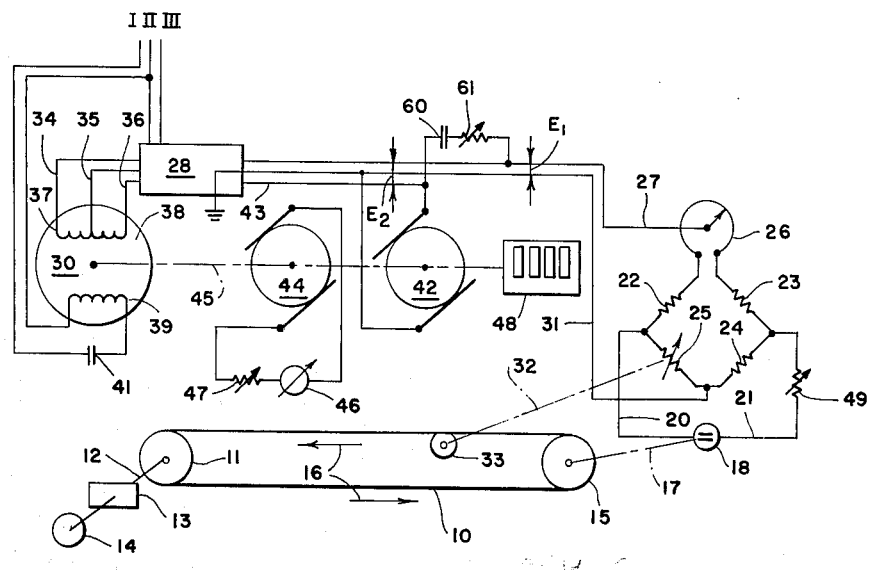
Figure 2:
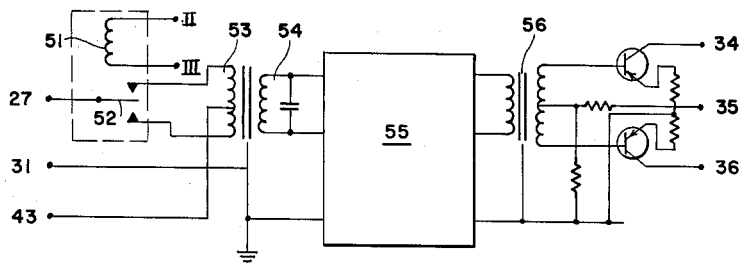
Figure 3:
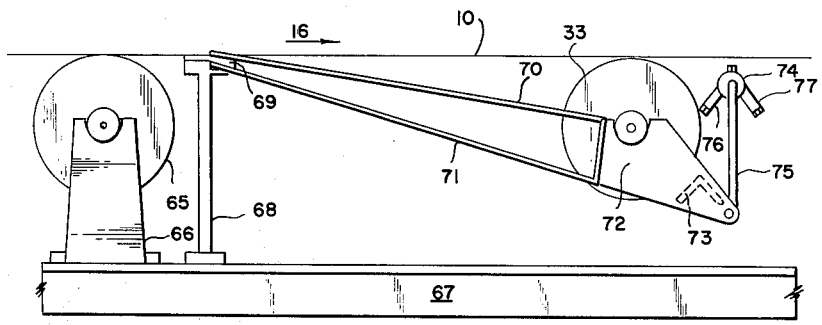
Figure 4:
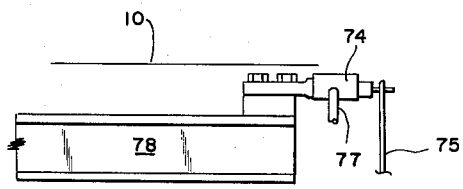

The invention will be further described below in connection with the attached drawings, which show one form of execution of the invention. However, it is obvious that the invention is not limited to this specific form of execution, but that different modifications may occur within the frame of the invention. In the drawings, FIG. 1 shows a principal sketch of an arrangement according to the invention, whereas FIG. 2 shows a wiring diagram of a transistor amplifier contained in the arrangement for controlling the servo motor. FIGS. 3 and 4 show the arrangement for bearing the roller, influenced by a tension variable resistor.

In FIG. 1 the conveyor band is indicated by 10. This conveyor band can of course be of deliberate length, and it may be carried up by any suitable number of carrier rollers, and it may also be driven by any suitable number of driver rollers. These circumstances are well known by the man skilled in the art and they have no immediate connection with the present invention. Therefor and in order to make this description more clear, the conveyor

2 band 10 has been shown driven by a driver roller 11, which is connected to a shaft 12, said shaft being driven by a motor 14 by means of a gearing device 13, and the band 10 has further been shown to be carried over one end roller 15. The direction of conveying is indicated by means of the arrow 16.

One of the carrier rollers or driver rollers occurring in this arrangement, in the present case the end roller 15, is connected by means of a shaft 17 with a tachometer generator 18 for creating a direct voltage proportional to the momentary speed of the band. This direct voltage is fed by means of the conductors 20 and 21 to two diagonally placed points in a bridge, consisting in three fixed resistors 22, 23 and 24, possibly settable for calibration purposes, and at least one tension variable resistor 25. In the form of execution shown in the drawing it has been assumed that all of the three resistors 22, 23 and 24 are fixed, but that for taration purposes a potentiometer 26 has been connected between the terminals of the resistors 22 and 23. The slider on the potentiometer 26 functions for taration and is connected to a conduit 27 to the control arrangement 28 for the servo motor 30, whereas the opposite diagonal point of the bridge, i.e. the connection point between the resistor 24 and the tension variable resistor 25 is, over the conductor 31, connected to a second input terminal of the control apparatus 28.

The arrangement now described functions in the following way:

The speed of movement of the band is in direct proportional relation to the direct current given off from the tachometer generator 18, with which the bridge is fed. At constant unbalance in the bridge the output voltage between the conductors 27 and 31, which is indicated in the drawing by $E_1$, will be proportional to the working voltage of the bridge and consequently also to the speed of movement of the band 10. The tension variable resistor 25 is influenced over a power transfer device 32 from a weigher roller 33, which is in its turn influenced by the weight of the band and the goods existing on it. If this resistor is shaped in the correct way, it will therefore change its value in direct proportion to the weight of the goods passing at each separate moment over the roller 33, and thereby also a proportional change of the output voltage across the conductors 27 and 31 will be created. The voltage $E_1$ will therefore be proportional to the speed of movement as well as to the momentary amount of conveyance of goods, which means that a volt-meter, connected to the voltage $E_1$, would indicate the momentarily transported quantity of goods, e.g. the number of tons per hour, whereas a volt-hour-meter, driven by the voltage $E_1$, would integrate this momentary statement of weight and therefore indicate the total quantity of goods conveyed.

It has been mentioned already above that traditional weighing devices have, in their forms of execution occurring hitherto, been rather inaccurate and that the present invention refers in the first place to an improvement of the accuracy at them.

An investigation of the reasons of the non-satisfactory accuracy has shown that this may depend upon three different circumstances:

Firstly, the resistors used hitherto, which were connected in the place in the bridge of the tension variable resistor 25, were often mechanically settable by transfer mechanisms, but any such mechanical transfer mechanism, which has for its purpose to reset the slider of a slider resistor, must necessarily be connected with very big possibilities of error.

Secondly, the taration of the own weight of the band has caused difficulties in many a case and could not be executed with the required accuracy, especially considering that the band may often in its fresh state have different weight per unit of length in different places, and that it may further, during use, be worn in an uneven way and/or be provided with an unevenly distributed fixed deposit.

Thirdly, there is no volt-hour-meter existing, which reacts linearly for the voltage $E_1$ with a maintained desired accuracy, said voltage indicating the momentarily conveyed value of the weight of goods, and the integration by means of this meter has therefore caused the introduction of an error.

By the use of tension variable resistors, especially as the resistor 25 in the bridge, the first above-mentioned source of error is done away with. Simultaneously, the bridge will be so simple and reliable, that one can with easily controllable further bridge elements provide a satisfactory taration and adjustment of same to indicate a voltage, which is really proportional to the product of the speed of movement of the band and to the momentary weight of the goods. By the use of the servo motor 30 in combination with its control arrangement 28 one will finally gain a mathematically correct integration of the output voltage $E_1$ from the bridge. This takes place in the following way:

In the control apparatus 28 a reverter from direct current to alternating current is contained. This may suitably be a vibrator reverter, the frequency of which is controlled from a three-phase alternating current main I–II–III, which should preferably have a constant voltage. The control device further contains an amplifier for the alternating voltage thus created. This amplifier is preferably a transistor amplifier, the output circuit of which is connected in push-pull, so that the output voltage appears between the three conductors 34, 35 and 36, which run to the two windings 37 and 38 belonging to the one winding system of a two-phase alternating current motor. The other winding system is formed by one single winding 39, which is fed, over a phase adjustment condenser 41, from the phase conductors I and II in the alternating current mains.

A two-phase alternating current motor of this kind would theoretically possibly rotate with a number of turns, which would be proportional to the input voltage $E_1$, if it is braked with a load, the moment of which is proportional to the number of turns, but in practice such a motor is mainly as unreliable as a meter of the above mentioned kind. Therefore, on the shaft of the motor 30 a tachometer generator 42 has been provided, said generator, due to its nature, giving off a direct current voltage, which is exactly proportional to the speed of rotation of the motor 30. This voltage is fed between the conductor 31 and a conductor 43 in opposition of direction to the voltage $E_1$ between the conductors 31 and 27, as shown in FIG. 1 by means of the voltage indication $E_2$. At equality of voltage $E_1 = E_2$ the voltage between the conductors 27 and 43 will therefore be zero. By the influence of the control arrangement this equality of voltage is used for keeping the number of turns of the motor 30 constant and due to the accuracy, existing in the tachometer generator 42, a control of the number of turns of the motor 30 will consequently take place in such a way, that it will be so closely proportional to the magnitude of the input voltage $E_1$ as allowed by the existing control margin.

For measuring the momentary transportation of material a further tachometer generator 44 is provided on the shaft 45 of the two-phase motor 30, and this voltage is connected to a volt meter 46, the scale of which is graduated in suitable quantity-per-time measurement, e.g. in tons per hour or the like. For adjustment of this scale a settable resistor 47 is connected in series with the volt meter. Further an integrating counter 48 of well known construction is directly connected to the shaft 45 of the motor 30, so that it will indicate the total quantity of transported material.

Finally, a resistor 49 may advantageously be connected into the conductor 21 from the tachometer generator 18 to the bridge 22–25.

If in the state of rest, i.e. without any load on the weigher roller 33, the resistors 24 and 25 were equal, and thus the resistors 22 and 23 were also equal, the last-mentioned ones including their respective participations of the resistance divider 26, then obviously the voltage $E_1$ across the conductors 27 and 31 would be zero. When the device is put in function without any goods yet being transported, the weigher roller 33 is loaded by the own weight of the band 10, which may vary from place to place of the band, viz for reasons which have been explained above. One has therefore to let the band run idly a full turn of its length and thereby to read the registration in the counter 48. This may due to differences in own weight of the band be assumed to move to and fro, but with a complete taration of the own weight of the band the counter will after one fullfilled turn of the band again be in its starting position. If this should not be the case, obviously an adjustment of the own weight of the band must be made, and it is just for this purpose that the resistance divider 26 has been introduced. After one has by setting the resistance divider 26 taken care of full taration of the own weight of the band, an adjustment of the voltage of the tachometer generator 18 takes place. One is thereby loading the weigher roller with a known weight and causing the band to move idly a given length. The meter 48 will then register this weight, multiplied by the given length, neither more nor less. If this should not be the case, it will show, that the tachometer generator 18 has a too high or too low output voltage, and one has then to cause a compensating setting of the resistor 49. If the weight should instead be directly applied on the band and either concentrated or distributed in a way known per se over a longer distance on the band, then one may also control the indication of the meter 46 and adjust an error, possibly existing, by setting the resistor 47.

After this general description of the invention, reference will now be made to FIGS. 2 and 3, and a description will be given of the character of the control apparatus 28, as well as of the way, in which the tension variable resistor 25 is connected to the band conveyor in order to avoid errors in each of these two parts.

In FIG. 2 the phase conductors II and III are connected to a vibrator coil 51, the tongue of which, 52, vibrates between two contacts connected to each terminal of a coil 53 in a transformer with the secondary coil 54, said coil 53 being provided with said point tap. Consequently a voltage of the mains frequency will occur in the secondary winding, said voltage having a magnitude which is proportional to the voltage between the terminals connected to the conductors 27 and 43. The conductor 31 is the ground conductor. If accidentally this voltage should be equal to zero, then also the secondary voltage across the coil 54 will be equal to zero. The alternating voltage in the secondary winding 54 is now amplified over a transistor connected amplifier 55, known per se. Such amplifiers have the property of providing an approximately constant voltage gain. The kind of this transistor coupling would scarcely need description, because it is well known to any man skilled in the art. The result will, however, be that a voltage will exist in an output transformer 56 in push-pull coupling, said voltage being of the frequency of the mains I–II–III and of a voltage which is sufficient for sure action of the one winding system 37–38 of the two-phase motor 30. The three terminals on the secondary side of the transformer 56 are connected to the conductors 34, 35 and 36, see FIG. 1.

Several smaller details of the arrangement may act further improving on the accuracy of the measuring made. Amongst such details should be mentioned the following ones:

The existing tachometer generators or one or more of them may be made as unipolar machines. The generator 42 should be of this kind. This means a simplification as far as regards the construction, giving a rapid reaction for occurring changes in number of turns and thereby also a rapid reaction of all of the weighing device for occurring changes in weight relations on the conveyor band. By the unipolar generators having a permanent magnet system of high remanence, they are not dependent upon any armature reaction, and the output voltage is down to zero voltage exactly proportional to the number of turns. It may thereby be important that the contact surface between each of the brushes and its slip-ring is placed in an electric equipotential level, whereby one may also avoid the creation of spread field voltages.

A damping circuit, consisting of a condensor 60 and a resistor 61 in series coupling, may suitably be connected between the conductors 27 and 43 for preventing that alternating voltages or currents, given off from the tachometer generator or created at sudden changes of the output voltage of the tachometer generator, enter into the control apparatus 28. If such alternating currents should be fed to the control apparatus 28, then the consequence would be a given instability of the servo motor 30. This instability presents itself in a periodic or aperiodic oscillation of the servo motor, for instance at suddenly occurring freedom from load on the conveyor band 10. By means of a suitable setting of the resistor 61 the damping may be made weakly periodical, which causes the servo motor to follow the control voltage $E_1$ the most rapid way.

The servo motor 30 is preferably provided with a separately beared iron core and a cup-formed rotor part, which causes a decreased moment of inertia.

The tachometer generator 18 should be dimensioned preferably for a relatively low number of turns. It may be made as an alternating current machine with a multiphase stator and a permanently magnetical rotor and subsequent rectification. Further it is suitable to introduce total compensation of temperature by means of thermistors, so that no errors are introduced by variations of the temperature of the surroundings.

In FIG. 3 a longitudinal section is shown through a section of the band conveyor. The band 10 is here shown to pass over one of the fixed carrier rollers 65, carried up in bearing jacks 66 on a foundation 67 made of profiled iron. At each side of the band supports 68 are provided, which carry a spring 69 in such a way, that this spring may bend itself in the vertical direction about a curvature centre, falling in the level of the band 10. The free end of the spring 69 carries a framework construction, consisting in two bars 70 and 71, respectively, and a connection part 72, connecting them, said part having the form of a triangular plate. Therefore there is a construction of a support 68, bars 70 and 71 and the plate 72 on each side of the band. The two plates 72 are mutually connected by means of a bar 73 made of profiled iron. In the two triangular plates 72 the weigher roller 33 is beared turnable. The higher the weight of the transported goods is, the more influence will the weight of the band and the goods stored thereon have, when passing the weigher roller 33, and the consequence will then be a lowering of all of the construction of the arms 70 and 71 together with the plate 72, simultaneously with bending of the spring 69. At the lower corner of the plate 72 on each side of the band, a pull bar 75 is geared, said bar being connected to the free end of a tightened means 74, containing at least one tension variable resistor, see also FIG. 4. This means 74 is fixed to a beam 78 in connection with the support and running across the conveyor direction of the band. The electrical terminals of the resistor are indicated by 76 and 77.

This arrangement functions in the following manner:

When the band together with a variable load passes the weigher roller 33, its depression will increase or decrease, simultaneously as the framework construction of the bars 70 and 71 and the plate 72 is swinging upwards and downwards. By means of the pull bars 75 these movements are transferred to each of the two tension variable resistance units 74, their accidental resistance value thereby varying in the stated way. If one side of the band should be more loaded with goods than the other side, consequently the resistance unit present on the first-mentioned side will be influenced more strongly. The resistances are, however, connected in some suitable way, for instance in such a parallel coupling, that the one resistance unit assumes the place of the resistors 24 and 25 in the bridge, whereas the other one assumes the place of the resistors 23 and 22 in the bridge, the resulting unbalance in the bridge thereby representing a mean value, corresponding to the depression of the band over the weigher roller 33, which should have taken place, if the load had been evenly distributed over the width of the band.

The total resistance value being contained in the bridge, this will consequently get into unbalance. The unbalance voltage will be linearly dependent upon the load but also upon the voltage from the tachometer generator 18, and therefore the output voltage $E_1$ from the bridge will form a measure on the product of load and conveying speed or, in other words, of the weight per unit of time of the transported amount of goods.

The voltage $E_1$ is hereafter reverted in the control apparatus 28, FIG. 1, into an alternating voltage of the frequency of the mains and of a magnitude, which is at least approximately proportional to the initially occurring voltage $E_1$. This alternating voltage, however, does not exist continuously as an input voltage in the control apparatus, because by the created alternating voltage the servo motor 30 is immediately put into rotation, and the tachometer generator 42 then creates a counter-acting direct voltage against the voltage $E_1$, so that the voltage difference is maintained in a state of balance. The shaft of the motor 30 will then rotate with a number of turns, which is very closely proportional to the voltage $E_1$ or, in other words, to the weight of the goods, conveyed on the band conveyor per unit of time. The quantity of these goods is stated by means of the measuring instrument 46 and in integrated form by the counter 48.

I claim:

1. An apparatus for weighing loads on a continuously moving conveyor belt and comprising a conveyor belt including a plurality of rollers supporting said belt, a first tachometer generator drivingly connected to one of said rollers to generate an output voltage responsive to the speed of said belt, a bridge coupling having a plurality of resistors, one of said resistors having a variable electrical resistance, two opposed points of said bridge coupling connected to the output voltage of said first tachometer generator, means for operatively connecting said variable resistance resistor to another of said rollers so that the resistance of said resistor is responsive to the weight of said belt and a load thereon, the output of said bridge coupling being measured across the other two opposed points and being responsive to the weight of the load carried on said belt per unit time, a servo motor including a control arrangement connected across said other two opposed points of said bridge coupling, a second tachometer generator drivingly connected to said servo motor so as to be responsive to the output voltage of said bridge coupling to produce an output voltage, said second tachometer generator output voltage being connected in counter coupling to the output voltage of said bridge coupling.

2. An apparatus for weighing loads as claimed in claim 1 wherein the voltage output of said bridge coupling is a direct voltage, means in said control arrangement for converting said direct voltage output of said bridge coupling into alternating voltage having the frequency of the main line, means in said control arrangement for amplifying said alternating voltage at substantially constant amplification, said servo motor having a first winding acting as a two phase motor and connected to said amplified alternating voltage and a second winding connected to said main line.

3. An apparatus for weighing loads as claimed in claim 1 and further comprising a counter connected to the output shaft of said servo motor for indicating the total weight of the load carried by said belt.

4. An apparatus for weighing loads as claimed in claim 1 and further comprising a third tachometer generator drivingly connected to the output shaft of said servo motor, a voltmeter connected to the output terminals of said third tachometer generator, the scale of said voltmeter being graduated to indicate directly the total load conveyed by said belt per unit time.

5. An apparatus for weighing loads as claimed in claim 4 wherein the connection of said second tachometer generator to the output voltage of the bridge coupling is separate from the voltmeter connection of said third tachometer generator.

6. An apparatus for weighing loads as claimed in claim 1 and further comprising a calibration resistor connected between said bridge coupling two opposed points and said first tachometer generator.

7. An apparatus for weighing loads as claimed in claim 1 wherein said first tachometer generator is of the alternating current type, there being a rectifier connected in the output circuit of said first tachometer generator, and thermistors in said output circuit to compensate for voltage variations due to temperature.

8. An apparatus for weighing loads as claimed in claim 1 and further comprising a resistance divider at one of said two opposed points of said bridge coupling with a portion of the resistance of said divider being in series with each of the resistor on each side of said one point.

9. An apparatus for weighing loads as claimed in claim 1 and further including first and second conduits electrically connecting the output of said bridge coupling to the input of said control arrangement, a third conduit connected to the input of said control arrangement and the output of said second tachometer generator being connected to said second and third conduits, and a filter comprising a condenser and a resistor in series therewith connected between said first and third conduits.

10. An apparatus for weighing loads as claimed in claim 9 with said filter resistor being adjustable.

11. An apparatus for weighing loads as claimed in claim 1 with said second tachometer generator being unipolar.

References Cited by the Examiner
UNITED STATES PATENTS

| | | | |
|---|---|---|---|
| 1,777,670 | 10/30 | Hausman | 177—210 X |
| 2,746,739 | 5/56 | Philippovic | 177—16 |
| 2,927,785 | 3/60 | Lyons | 177—16 |
| 2,954,969 | 10/60 | McCollough et al. | 177—211 X |
| 2,990,937 | 7/61 | Goslin | 198—39 |
| 3,115,201 | 12/63 | Brumbough | 177—16 |

LEO SMILOW, *Primary Examiner.*